United States Patent [19]

Shah

[11] Patent Number: 5,049,269

[45] Date of Patent: Sep. 17, 1991

[54] FILTER ASSEMBLY WITH SPRING LOADED VALVE

[75] Inventor: Satish S. Shah, Rockford, Ill.

[73] Assignee: Sunstrand Corporation, Rockford, Ill.

[21] Appl. No.: 363,518

[22] Filed: Jun. 8, 1989

[51] Int. Cl.[5] .......................................... B01D 27/10
[52] U.S. Cl. ................... 210/234; 210/429;
210/430; 210/440; 210/443; 251/149.6; 137/549
[58] Field of Search ............... 210/DIG. 17, 234, 429,
210/430, 440, 443; 251/149.6; 137/549

[56] References Cited

U.S. PATENT DOCUMENTS

| | | | |
|---|---|---|---|
| 4,082,673 | 4/1978 | Cilento | 210/234 |
| 4,529,514 | 7/1985 | Gruett | 210/234 |
| 4,818,397 | 4/1989 | Joy | 210/234 |
| 4,832,077 | 5/1989 | Pilolla | 137/549 |

*Primary Examiner*—Robert A. Dawson
*Assistant Examiner*—David Reifsnyder
*Attorney, Agent, or Firm*—Wood, Phillips, Mason, Recktenwald & Van Santen

[57] ABSTRACT

The problem of protecting a spring (44) of a spring loaded valve member (34) in a filter assembly (10) is solved by providing a valve body (12) defining a valve seat (20), with the valve member movable in the valve body to and from a closed position against the valve seat. The spring is disposed in a cavity (46) in the valve body, the spring biasing the valve member toward its closed position against the valve seat. The cavity has a mouth located in the path of movement of the valve member for closing by the valve member to capture and isolate the spring when the valve member moves to an open position away from the valve seat. A filter bowl (22) is removably attached to the valve body for automatically opening the valve member in response to attaching the bowl to the valve body.

17 Claims, 1 Drawing Sheet

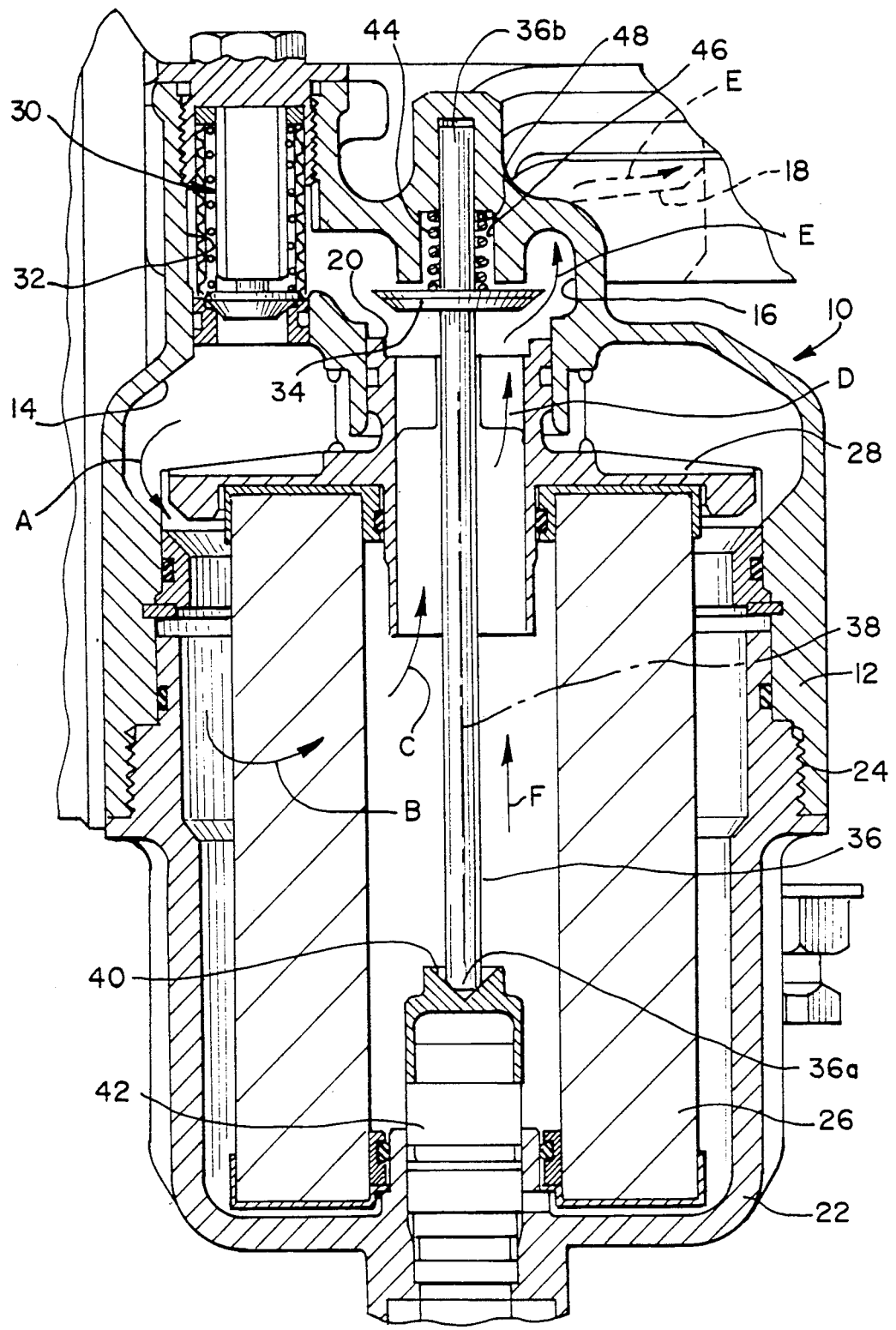

FILTER ASSEMBLY WITH SPRING LOADED VALVE

FIELD OF THE INVENTION

This invention generally relates to filter assemblies and, particularly, to filter assemblies having removable filter bowls and spring loaded valves.

BACKGROUND OF THE INVENTION

There are a wide variety of filter assemblies which include a valve body through which a fluid flows past a spring loaded valve. A filter bowl may be removably attached to the valve body and to position a filter so that the fluid flows through the filter as it passes into and out of the valve body. The valve may be spring loaded toward closed or open positions. In some instances, such as in an anti-siphon valve, the spring biases the valve toward its closed position, and the valve is operatively associated with the filter bowl so that the valve automatically closes when the bowl is removed from the valve body for replacing the filter, for instance. Therefore, the flow of fluid is stopped to prevent leakage during filter replacement.

A problem with filter assemblies of the character described above is that the spring which loads the valve is exposed in the fluid flow path through the valve body. This causes the spring to become eroded because of contamination by the fluid, and the spring can become damaged because of continuous vibration when so exposed. This problem is particularly magnified in aircraft or aerospace applications wherein such filter/valve assemblies are designed as precise instruments and the spring is very delicate.

This problem of spring damage is further magnified in aerospace applications wherein the spring may break loose after severe erosion and enter a fluid system where further damage can result in a life threatening condition This invention is directed to solving the above problems of spring erosion or damage by completely isolating the valve spring when the valve assembly is in operative condition.

SUMMARY OF THE INVENTION

An object, therefore, of the invention is to provide a new and improved filter assembly for capturing the spring means of a valve member when the filter assembly is operative.

The invention generally contemplates a filter assembly having a valve body defining a valve seat, with a valve member movable in the body to a closed position against the valve seat. Resilient means are disposed in a cavity in the valve body for biasing the valve member toward its closed position against the valve seat The cavity has a mouth located in the path of movement of the valve member for closing by the valve member to capture the resilient means when the valve member moves to an open position away from the valve seat.

In the exemplary embodiment of the invention, the valve body has an inlet and an outlet and passage means communicating between the inlet and the outlet. A valve stop is located in the passage means defining the valve seat. The valve member is movable in the valve body across the passage means to and from its closed position against the valve seat. A bowl is removably attached to the valve body. A filter is disposed in the valve bowl communicating with the passage means. Valve actuating means are operatively associated between the bowl and the valve member for moving the valve member to an open position in response to attaching the bowl to the valve body. The resilient means is in the form of a spring for biasing the valve member toward its closed position against the valve seat The cavity is located relative to the valve member to be completely closed by the valve member to capture and protect the spring from any moving fluid when the valve member is in its open position.

Other objects, features and advantages of the invention will be apparent from the following detailed description taken in connection with the accompanying drawings.

BRIEF DESCRIPTION OF THE FIGURE

The features of this invention which are believed to be novel are set forth with particularity in the appended claims. The invention, together with its objects and the advantages thereof, may be best understood by reference to the following description taken in conjunction with the accompanying drawing, wherein the single FIGURE is an axial section through a filter assembly embodying the invention.

DETAILED DESCRIPTION OF THE PREFERRED EMBODIMENT

Referring to the drawing in greater detail, a filter assembly, generally designated 10, includes a valve body 12. The valve body has inlet means including an inlet chamber 14 having an appropriate inlet port (on the backside of the filter body but not visible in the drawing), and outlet means including an outlet chamber 16 communicating with an outlet port (on the backside of the valve body and visible only by dotted lines 18). Inlet chamber 14 and outlet chamber 16 define portions of a passage means for a fluid through the valve body and through a central or axial passage surrounded by a valve stop 20 defining a valve seat.

A cup-shaped filter bowl 22 is removably attached to valve body 12, as by a threaded connection 24. The bowl carries a cylindrical filter 26 which can be easily removed and replaced by unthreading filter bowl 22 from valve body 12. The upper end of filter 26 seals against an annular land-forming ring 28 within the filter body. When the filter is secured in place by bowl 22, inlet chamber 14 is separated from outlet chamber 16 by filter 26 to require the fluid to enter the filter bowl and pass through the filter when flowing between the inlet and the outlet of the valve assembly.

Specifically, the fluid enters valve body 12 into inlet chamber 14. The fluid then flows around annular ring 28 in the direction of arrow "A" and downwardly toward the interior of filter bowl 22. The fluid then flows through filter 26, as indicated by arrow "B", and then back upwardly in the direction of arrow "C" through the passage defined by valve stop 20, as indicated by arrow "D", and into outlet chamber 16. The filtered fluid then flows from the outlet chamber out of the valve body through outlet port 18, as indicated by arrows "E".

As is sometimes conventional with such valve assemblies, a bypass valve, generally designated 30, is provided in a bore 32 in the valve body communicating between inlet chamber 14 and outlet chamber 16. Such a valve body usually is pressure responsive for opening in the event that filter 26 becomes clogged, providing a safety measure.

A generally planar valve member 34 is mounted on a valve stem 36 extending axially of the valve assembly. In other words, an axis 38 of valve stem 36 defines the center of the passage defined by valve stop 20, with outer inlet chamber 14, inner outlet chamber 16, filter 26 and filter bowl 22 all being concentric about axis 38 and valve stem 36.

The lower distal end 36a of valve stem 36 seats in a socket 40 of a member 42 fixed to the inside of the base of filter bowl 22. Therefore, a valve actuating means is provided operatively associated between filter bowl 22 and valve member 34 for moving the valve member away from its valve seat, as defined by stop 20, upwardly in the direction of arrow "F" automatically in response to threadingly attaching filter bowl 22 to valve body 12. Valve stem 36 acts as an actuating rod of the valve actuating means for opening the valve member.

Valve member 34 is biased by resilient means toward its valve closed position against stop 20, i.e. opposite the direction of arrow "F" so that the valve member automatically closes in response to removing filter bowl 22 from valve body 12 for replacing filter 26. This provides an anti-siphon system to prevent the fluid from flowing or leaking out of the valve body during replacement of the filter.

More particularly, valve stem 36 projects through planar valve member 34, as shown by the upper distal end 36b of the valve stem. A coil spring 44 surrounds upper end 36b of valve stem 36. The spring is located in a stepped cavity 46 within the upper area of valve body 12. The stepped cavity defines a shoulder 48 so that coil spring 44 is sandwiched under compression between shoulder 48 and the top of valve member 34, thereby biasing the valve member toward its closed position against the valve seat defined by stop 20.

The invention contemplates locating spring cavity 46 such that its mouth is in the path of movement of valve member 34 as is clearly shown in the drawing. Therefore, when the valve member is moved to its open position as shown, the valve member completely closes the cavity and captures the spring therewithin. Consequently, the spring is completely isolated from any flowing fluid through the valve assembly. This greatly reduces or substantially eliminates erosion of the spring from the contaminating fluid and prevents vibrations of the spring that might be caused by fluid flow. The life of the spring is extended immeasurably and greatly diminishes the possibility of a broken spring part from entering the fluid system with which the filter assembly is associated.

It will be understood that the invention may be embodied in other specific forms without departing from the spirit or central characteristics thereof. The present examples and embodiments, therefore, are to be considered in all respect as illustrative and not restrictive, and the invention is not to be limited to the details given herein.

I claim:

1. A filter assembly, comprising a valve body having an inlet and an outlet an passage means communicating between the inlet and the outlet, a valve stop in the passage means defining a valve seat, a valve member movable in the valve body to and from a closed position against the valve seat, a bowl removably attached to the valve body, a filter disposed in the bowl communicating with the passage means, valve actuating means operatively associated between the bowl and the valve member for moving the valve member to an open position in response to attaching the bowl to the valve body, spring means for biasing the valve member toward its closed position against the valve seat, and receptacle means in the valve body for positioning and receiving the spring means, the receptacle means being sealed by said valve member when the valve member is in its open position to completely isolate the spring means from any fluid flowing through the filter assembly.

2. The filter assembly of claim 1 wherein said receptacle means comprise a cavity having a mouth in the path of movement of the valve member for sealing thereby.

3. The filter assembly of claim 1 wherein said valve actuating means comprise an actuator rod extending through the valve member into the receptacle means for positioning the spring means.

4. The filter assembly of claim 3 wherein said spring means comprise a coil spring surrounding the actuator rod.

5. The filter assembly of claim 1 wherein said valve seat is disposed on one side of the valve member for closing in response to movement of the valve member in one direction, said valve member having an opposite side, and said receptacle means includes a sealable mouth on said opposite side of the valve member for sealing in response to movement of the valve member in the opposite direction.

6. The filter assembly of claim 5 wherein said valve member is generally planar, and the valve seat and the mouth of the receptacle means lie in planes generally parallel to the valve member.

7. A filter assembly, comprising a valve body defining a valve seat, a valve member movable in the valve body to and from a closed position against the valve seat, resilient means disposed in a cavity in the valve body for biasing the valve member toward its closed position against the valve seat, the cavity having a mouth located in the path of movement of the valve member for sealing by the valve member to completely isolate the resilient means from any fluid flowing through the filter assembly when the valve member moves to an open position away from the valve seat, and a filter bowl removably attached to the valve body in communication with the valve seat.

8. The filter assembly of claim 7 wherein said valve seat is disposed on one side of the valve member for closing in response to movement of the valve member in one direction, said valve member having an opposite side, and said cavity includes a sealable mouth on said opposite side of the valve member for sealing in response to movement of the valve member in the opposite direction.

9. The filter assembly of claim 8 wherein said valve member is generally planar, and the valve seat and the mouth of the cavity lie in planes generally parallel to the valve member.

10. The filter assembly of claim 7, including an actuator rod extending through the valve member into the cavity for positioning the resilient means.

11. The filter assembly of claim 10 wherein said spring means comprises a coil spring surrounding the actuator rod.

12. A filter assembly, comprising a valve body defining a valve seat, a valve member movable in the valve body to and from a closed position against the valve seat, resilient means disposed in a cavity in the valve body for biasing the valve member toward its closed position against the valve seat, a bowl removably attached to the valve body, valve actuating means operatively associated between the bowl and the valve member for moving the valve member to an open position in response to attaching the bowl to the valve body, and the cavity having a mouth located in the path of movement of the valve member for sealing by the valve member to completely isolate the resilient means when the bowl moves the valve member to its open position away from the valve seat.

13. The filter assembly of claim 12 wherein said valve actuating means comprise an actuator rod extending through the valve member into the cavity for positioning the spring means.

14. The filter assembly of claim 13 wherein said resilient means comprise a coil spring surrounding the actuator rod.

15. The filter assembly of claim 12 wherein said valve seat is disposed on one side of the valve member for closing in response to movement of the valve member in one direction, said valve member having an opposite side, and said cavity includes a sealable mouth on said opposite side of the valve member for sealing in response to movement of the valve member in the opposite direction.

16. The filter assembly of claim 15 wherein said valve member is generally planar, and the valve seat and the mouth of the cavity lie in planes generally parallel to the valve member.

17. The filter assembly of claim 12 wherein said cavity has a mouth in the path of movement of the valve member for sealing thereby.

* * * * *